Feb. 4, 1936.   D. C. HESSIAN   2,030,039
AIR BRAKE MECHANISM
Filed Aug. 7, 1929   3 Sheets-Sheet 1
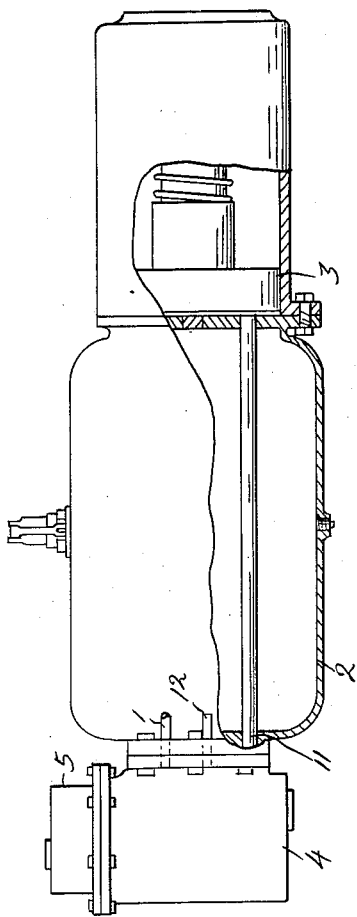
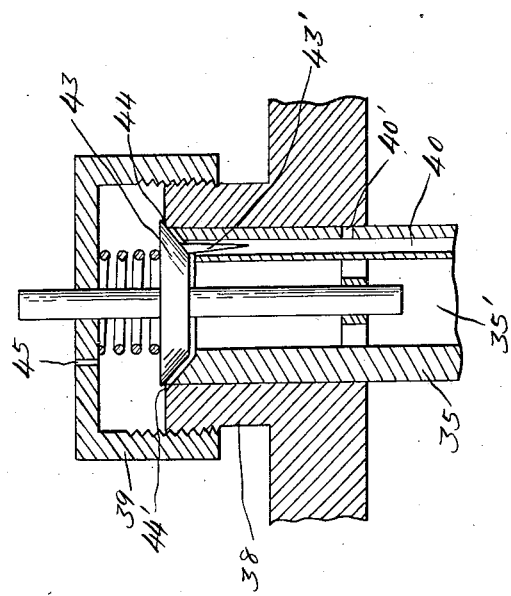
INVENTOR
Dennis C. Hessian
BY
ATTORNEYS Patented Feb. 4, 1936

2,030,039

UNITED STATES PATENT OFFICE 2,030,039

AIR BRAKE MECHANISM

Dennis C. Hessian, Detroit, Mich.; Anna Dalton executrix of said Dennis C. Hessian, deceased Application August 7, 1929, Serial No. 384,060

22 Claims. (Cl. 303—39)

This invention relates generally to air brake mechanisms and consists of certain novel features of construction, combinations and arrangements of parts that will be hereinafter more fully described, and particularly pointed out in the appended claims.

In the accompanying drawings:

Figure 1 is a diagrammatic view of air brake mechanism including a device embodying my invention;

Figure 3 is an enlarged detail section of one of the valve assemblies, showing a braking position thereof;

Figure 2:
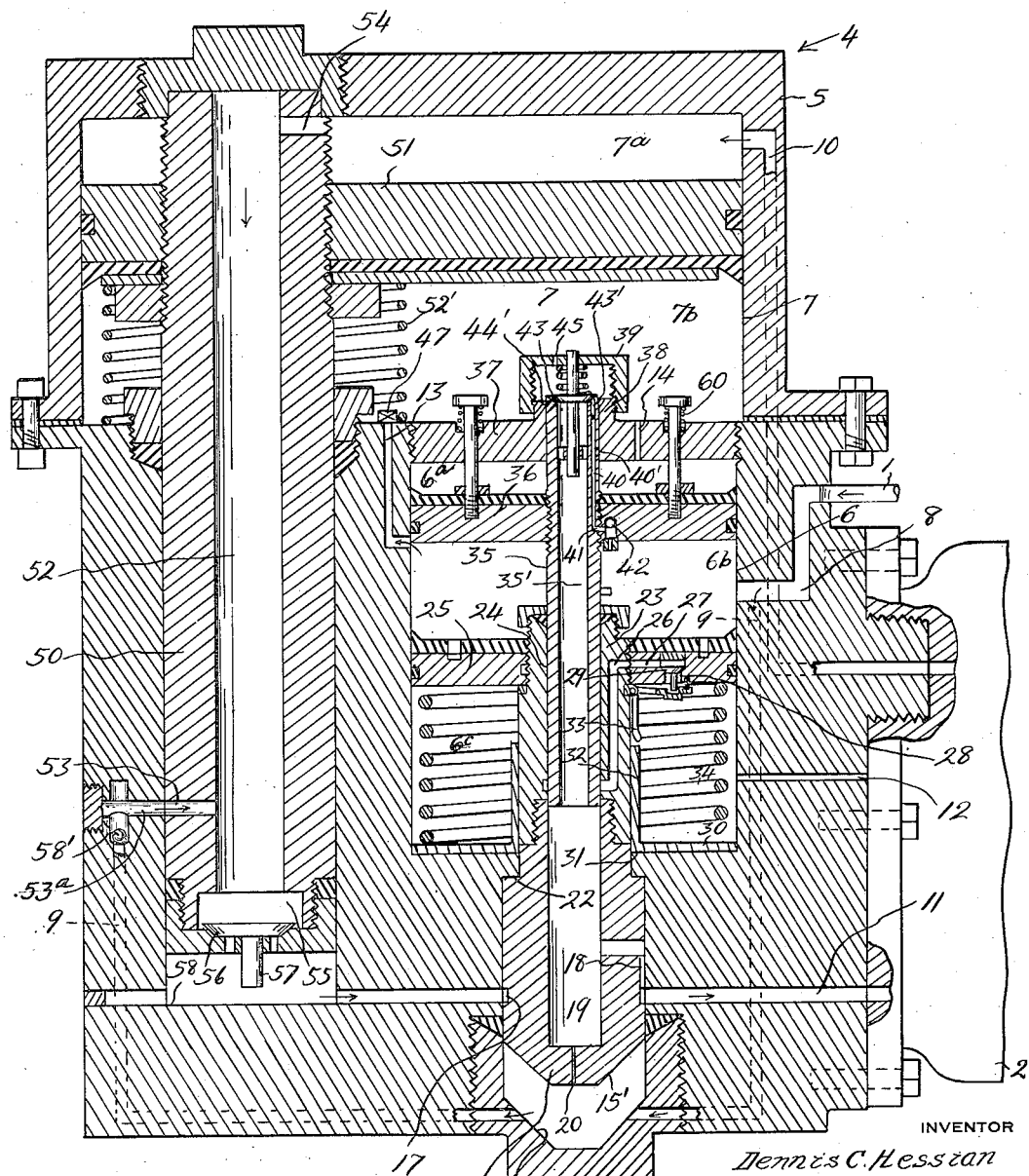
Figure 2 is a vertical sectional view through the device embodying my invention showing a transitory, preliminary position assumed by the parts in applying the brakes.

Referring now to the drawings, 1 is a section of the main air line or conduit of a train, 2 is an auxiliary reservoir adapted to receive air from the section 1, 3 is a brake cylinder adapted to receive air from the auxiliary reservoir, and 4 is a device embodying my invention for controlling the passage of air from the section 1 to the auxiliary reservoir 2 and to the brake cylinder 3.

As shown, the device 4 is bolted to one end of the auxiliary reservoir 2 and includes a casing 5 having chambers 6 and 7 respectively and having air passages 8, 9, 10, 11, 12, 13, and 14 respectively therein. Preferably the chamber 6 contains the means for controlling the flow of air between the train line 1 and the auxiliary reservoir 2 and between the auxiliary reservoir 2 and the brake cylinder 3 and also contains the means for controlling a supplemental supply of air from the chamber 6 directly to the brake cylinder 3. The chamber 7 contains the means for controlling the main supply of air from the auxiliary reservoir 2 to the brake cylinder 3. The passage 8 supplies air from the train line section 1 to the chamber 6, the passage 9 supplies air from the passage 8 to the chamber 7, the passage 10 conducts air to and from the chamber 7 and auxiliary reservoir 2, the passage 11 conducts air from the chamber 7 to the brake cylinder 3, the passage 12 is an exhaust or outlet passage from the chamber 6 to the atmosphere, the passage 13 conducts air from the chamber 6 to the chamber 7, and the passage 14 conducts air from the chamber 7 to the chamber 6.

In the chamber 6 is a reciprocating valve 15 of tubular formation adapted to control the flow of air through the passage 11 and having a tapered lower end 15' engageable with a seat 16 of corresponding formation for controlling the flow of air through the passage 9. Preferably this valve 15 has an annular groove 17 registerable with the passage 11 and adapted to permit or cut off the flow of air through the passage from the chamber 7 to the brake cylinder 3, and is provided at one side with an inverted L-shaped passage 18 for establishing communication between the longitudinally extending passage 19 within the valve and the passage 11 to permit air from the brake cylinder to enter the longitudinally extending passage 19. This valve 15 also has a restricted passage 20 in its lower end to permit air from the passage 9 to flow to the longitudinally extending passage 19 to compensate for leakage out of the brake cylinder 3 when the brakes (not shown) are set. The upper end of this valve is reduced providing a shoulder 22 and is threadedly connected to a follower 23 that has a longitudinally extending passage 24 constituting an extension of the passage 19 in the valve and that is adjustably connected at its upper end to a piston 25. Preferably this follower 23 has a substantially Z-shaped passage 26 therein for conducting air from the passage 24 to a passage 27 in the piston 25, and the latter has a passage 28 opening into the chamber 6 below the piston and controlled by a valve 29. A plate 30 rests upon a shoulder 31 of the chamber 6 and is provided with a tubular extension 32 that is sleeved upon the follower 23 and constitutes a trip for a bell crank lever actuator 33 for the valve 29. A coil spring 34 surrounds the follower 23 between the plate 30 and piston 25 and serves to move the piston 25, follower 23 and valve 15 upwardly.

Slidable in the passages 19 and 24 and constituting an upward extension thereof is a tube 35 that is threaded in a second piston 36 and slidably engages the partition 37 between the chambers 6 and 7. Preferably this partition 37 has a boss 38 upon which a cap 39 is threaded, and highly restricted communicating passages 40 and 41 are provided in the tube 35 and piston 36 respectively for conducting air from the chamber 6 to the cap 39. A ball 42 serves as a check valve in the passage 41 to prevent air from flowing from the passage 40 to the chamber 6, while a spring actuated valve 43 controls the flow of air from the passage 40 to the tube 35 and has a depending extension 43' that is adapted to close the passage 40. The pistons 36 and 25 divide the chamber 6 into an upper, an intermediate, and a lower space. These are designated respectively $6a$, $6b$, and $6c$. An opening 45 is provided in the cap 39 that air from the chamber 7 may flow into the cap and thence into the tube 35, and a groove 44' is provided in the seat 44 to permit air from the cap 39 to flow into the tube 35. In this connection it will be noted that the passage 40 in the tube 35 has a branch 40' that is adapted to be closed by the partition 37 when the tube 35 is in raised position, but is adapted to be opened when the tube 35 is in fully lowered position. In the present instance, the flow of air from the chamber 6 to the passage 13 is controlled by the piston 36 and a suitable check valve 47 prevents air from flowing from chamber 7 to passage 13.

The chamber 7 is inverted L-shape in form and contains a tubular valve 50, a piston 51, and a coil spring 52'. The spaces formed in the chamber 7 above and below the piston 51 are designated respectively $7a$ and $7b$. As shown, the valve 50 controls the flow of air from the passage 9 to the space $7a$ and has a longitudinally extending passage 52, a transverse passage 53 for conducting air from the passage 9 to the longitudinally extending passage 52, and has a transverse passage 54 for conducting air from the passage 52 to the chamber $7a$ above the piston 51. This valve 50 is also provided at its lower end in communication with the passage 52 with a valve chamber 55 in which a valve 56 is located for controlling the flow of air from the passage 52 to the passage 11 leading to the brake cylinder. Preferably this valve 56 has a depending extension or stem 57 that is engageable with the base 58 of the chamber 7 when the valve 50 is in lowermost position to unseat the valve 56 and permit air from the passage 52 to flow to the passage 11. Any suitable means such as the ball 58' may be used as a check valve to permit air to flow from the passage 9 to the passage 52 but to prevent its return. As shown, the piston 51 is threaded upon the valve 50 above the partition 37, and the spring 52' surrounds the valve 50 between this piston 51 and the shoulder 59 of the chamber 7.

When a brake system incorporating the described apparatus is being charged with air, as in starting a train on its run, pressure is progressively built up in the train pipe 1 and space $6b$ of each braking unit until the spring 34 is overcome, allowing the corresponding piston 25 to descend. The piston 36 of each unit if not already raised, will be uplifted well in advance of down travel of the piston 25, since a slight preponderance of pressure below said piston as compared to that above it will effect such an uplift.

The piston 36, when raised, uncovers the passage 13 and further causes the valve 43 to seat upon and close the upper end of the tube 35. Hence air will flow freely up through the passage 13 into the space $7b$, and from the latter through the port 14 into the space $6b$. Thus pressure will build up concurrently in the space $6b$, $7b$ and $6a$, and will be equalized in these three spaces when charging is completed.

Assuming atmospheric pressure in the auxiliary reservoir and space $7a$ at the commencement of charging, the piston 51 with its tubular valve member 50 will have been raised by the spring 52' to the position shown in Fig. 2, registering the ports 53 and $53a$. Train pipe air, therefore, will flow, during charging, through the passage 9, raising the check valve 58' and will enter the passage 52 through the aligned ports 53 and $53a$, thence passing through the port 54, space $7a$ and passage 10 to the auxiliary reservoir. Thus, while a charging pressure builds up in the spaces $6b$, $7b$ and $6a$, the same pressure accumulates in the auxiliary reservoir.

When the charging pressure reaches a value predetermined by resistance of the spring 34, the piston 25 is shifted to its lower limiting position, established by engagement of the valve head 15 with its seat 16. This prevents further flow in either direction through the passage 9, and also acts through the bell crank 33 to unseat the valve member 29.

Thus when the brake line is fully charged and the brakes are not applied, the pistons 36 and 51 are fully raised and the piston 25 fully lowered. Pressures are equalized in the spaces $6b$, $7b$, and $6a$ and in the train pipe, and a slightly lower pressure prevails in the auxiliary reservoir. The valve 29 is unseated and the brake cylinder is vented by way of passages 11, 18, 19, 26, 27, port 28, space $6c$, and outlet 12 to atmosphere. Also, seating of the valve 43 on the upper end of the tube 35 prohibits any loss of pressure through said tube from the space $7b$.

Figure 4:
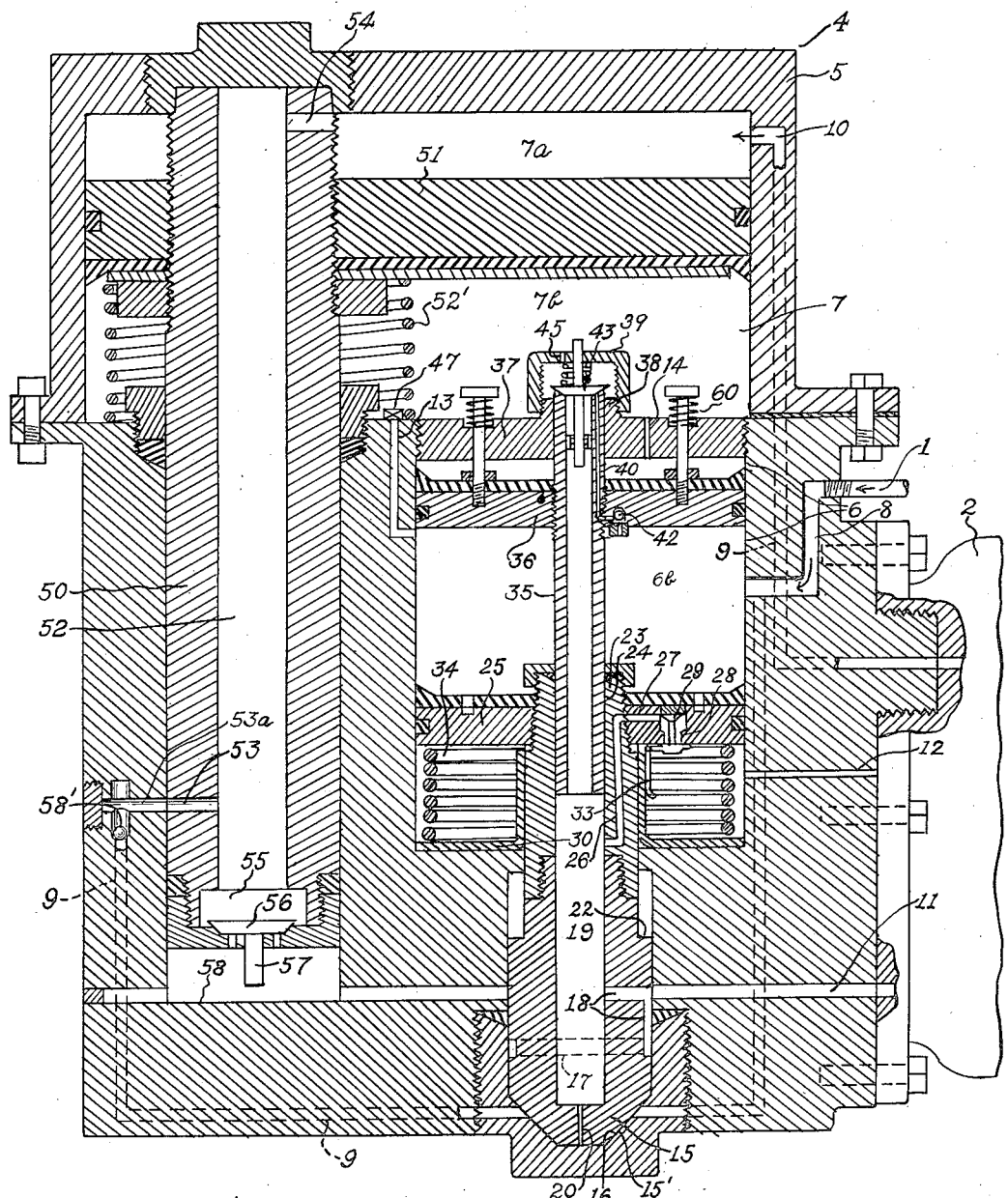
Fig. 4 is a view similar to Fig. 2, but showing the parts in running position with brake released.

The described position assumed by the parts after charging of the system is shown in Fig. 4 and is the normal or running position of the parts maintained during nonbraking travel of a train.

Assume now a service application of the brakes. Pressure in the train line and space $6b$ is thereby reduced according to the desired braking intensity. This reduction, for example, may range between three and twenty pounds, and to be effective, must decrease pressure in the space $6b$ below that exerted by the spring 34. Said spring, therefore, now elevates the piston 25 to its upper limiting position shown in Fig. 2. The check valve 47 prevents any downward escape of air from the space $7b$, and the superior pressure now prevailing in the spaces $7b$ and $6a$ effects lowering of the piston 36, slightly beyond the position shown in Fig. 2. For a service train pipe reduction, the piston 36 will descend sufficiently to unseat the valve member 43 from the tube 35 and to partially compress the springs 60, but the limiting lower position of said piston will not be reached.

Uncovering of the upper end of the tube 35 establishes a flow of air from the space $7b$ into the cap 39 through the port 45 and thence to the brake cylinder through the tube 35 and passage 11, whereby pressure in the space $7b$ rapidly drops below that in the auxiliary reservoir. Since this last mentioned pressure also prevails in the space $7a$, the piston 51 is now shifted to its lower limiting position in which the valve 56 is unseated. This initiates a discharge of air from the auxiliary reservoir to the brake cylinder by way of the passage 10, space $7a$, port 54, passage 52, and passage 11, whereby a brake-applying pressure is built up in said cylinder, and pressure in the auxiliary reservoir and space $7a$ is correspondingly reduced. When pressure in the space $7a$ thus becomes equalized with that in the space $7b$, the piston 51 automatically rises, responsive to the spring 52' permitting the valve 56 to seat and discontinuing air delivery to the brake cylinder.

Thus it is apparent that the magnitude of brake cylinder pressure established by any reduction of train pipe pressure, is directly proportioned to the magnitude of such reduction.

It is to be noted that uncovering of the tube 35 by the valve member 43 can reduce pressure in the space 7b only slightly beyond that prevailing in the space 6b, since when pressure in the latter space acquires a slight preponderance, the piston 36 will rise and reseat the valve 43 on the tube 35. In so rising, said piston will uncover the passage 13 and allow a sufficient slight upward transfer of air through said passage to again equalize pressures in the spaces 6b, 7b, and 6a.

Because of its highly restricted nature, the passage 40, 41 does not interfere with the operation, as so far described. Under non-braking conditions said passage is closed by the needle valve 43', since the member 43 carrying said needle valve is then seated upon the tube 35.

When, through a train pipe air reduction, the piston 36 and tube 35 are lowered, uncovering the upper ends of said tube and of the passage 40, 41, air discharges in a restricted flow from the space 6b to the tube 35, expediting the pressure reduction. Until the piston 25 rises, such air vents to the atmosphere, by way of the port 28. After rise of the piston 25 and resultant seating of the valve 29, such air is delivered into the brake cylinder. The described flow through the passage 40, 41, when the valve member 43 is clear of the tube 35, will be far less than the concurrent discharge to said tube from the spaces 7b and 6a (communicating at 14), and hence will not prevent the pressure in said spaces from falling rapidly below that in the space 6b, to initiate cutting off of the reservoir air delivery to the brake cylinder.

The port 40', it may be noted, is not uncovered unless the piston 36 descends to its extreme or limiting lower position. This occurs only responsive to an emergency reduction of train pipe pressure. the resulting differential between the pressures in spaces 6a and 6b being of such magnitude as to fully overcome the springs 60. Under such conditions, air discharges from the space 6a (and communicating space 7b) to the passage 40, 41 as well as from the space 6b, so that the application of the brake is very considerably expedited.

One advantage derived from the described valve mechanism is its adaptability to permit a recharging of the main air line and the auxiliary reservoirs of a train during a service application of the brakes. without release of the brakes or diminution of the braking pressure. The recharging air will enter the chamber 6 through the passage 8 and will also reach the auxiliary reservoir by way of passages 9, 53, 52, 54, and 10. Recharging will be stopped short of such pressure as would overcome the spring 34, and vent the brake cylinder through resultant lowering of the piston 25. Thus, for example, if train line and auxiliary reservoir pressure were reduced from 70 to 50 pounds in effecting an application of the brakes, and 70# pressure was required to overcome the spring 34, it would be possible to recharge the train line and auxiliary reservoirs to a pressure only slightly below 70# without effecting a release of the brakes.

This advantage which is not derivable from ordinary air brake valves is particularly desirable in descending long grades, under braking retardation.

The auxiliary reservoirs are adapted to be charged only up to a certain limiting pressure determined by resistance of the spring 34. This permits the train pipe, at its head end, to be overcharged sufficiently to charge the rear, as well as the front auxiliaries up to the predetermined limit. The overcharge will be at least an amount in excess of normal train pressure such as to bring the rear end auxiliaries up to the yielding point of the corresponding springs 34. The length of the train will ordinarily determine the requisite amount of overcharge, since the differential between front and rear end train pipe pressure will be generally proportionate to the train length. After so establishing normal uniform pressure in all of the auxiliaries, (that is to say, the pressure under which the spring 34 yields) the train pipe pressure may be reduced back to normal, without effecting an application of the brakes. Normal train pipe pressure will ordinarily slightly exceed the pressure required to overcome the springs 34.

As is well known, this is not possible with equipment now standard, which would involve a setting of brakes on reduction of an overcharge and which in case of an overcharge in the train pipe would involve, at any point, the same overcharge in the auxiliaries.

This feature of applicant's valve mechanism insures a substantially uniform pressure applied to the brake cylinders throughout the length of a train.

The retaining valves now commonly provided on each car are further unnecessary with the herein-disclosed system.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. In a device of the class described, a casing having a chamber adapted to be supplied with air from the main train line conduit, a second chamber adapted to receive air from the first chamber, means for conducting air from the second chamber to a brake cylinder, auxiliary means for conducting air from the second chamber to the brake cylinder, means for controlling the passage of air from the first chamber to the second chamber, and means associated with said last mentioned means for controlling the passage of air from the second chamber to the brake cylinder.

2. In a device of the class described, a casing having a chamber adapted to be supplied with air from the main train line conduit, a second chamber adapted to receive air from the first chamber, means for conducting air from the second chamber to a brake cylinder, auxiliary means for conducting air from the second chamber to the brake cylinder, means in the first chamber for controlling the passage of air therefrom to the second chamber, means operable by said last mentioned means for controlling the passage of air from the second chamber through the first mentioned conducting means to the auxiliary reservoir, and means under the control of the first mentioned controlling means for controlling the passage of air from the second mentioned chamber through the auxiliary conducting means to the brake cylinder.

3. In a device of the class described, a casing having a chamber adapted to be supplied with air from the main train line conduit, a second chamber adapted to receive air from the first chamber, means for conducting air from the second chamber to a brake cylinder, auxiliary means for conducting air from the second chamber to the brake cylinder, means in the first chamber for controlling the passage of air therefrom to the second chamber, means in the second chamber for controlling the passage of air therefrom to the auxiliary reservoir, and means under the control of the first mentioned controlling means for regulating the passage of air from the second chamber through the auxiliary conducting means to the brake cylinder.

4. In a device of the class described, a casing having a chamber adapted to receive air from the main train line conduit, a second chamber adapted to receive air from the main train line conduit, means for conducting air from the first chamber to the second chamber, means for conducting air from the second chamber to the first chamber, means for conducting air from both chambers to a brake cylinder, means associated with the last mentioned means for conducting air from the brake cylinder through the first mentioned chamber to the atmosphere, and means under the control of the last mentioned conducting means for controlling the passage of air from the brake cylinder to the atmosphere.

5. In a device of the class described, a chamber adapted to receive air from the main train line conduit, means for conducting air from said chamber to a brake cylinder including, telescopically arranged members, one of said members having a passage extending longitudinally thereof and in communication with said chamber, and means for controlling the passage of air from said longitudinally extending passage to said member including a valve engageable with said member and having an extension engageable with the walls of said passage.

6. In a device of the class described, a casing having a chamber adapted to receive air from the main train line conduit, means including telescopically arranged tubular members for conducting air from said chamber to a brake cylinder, and means including said telescopically arranged members for conducting air from the brake cylinder to the atmosphere, and means for controlling the passage of air from said members to the atmosphere including means operable upon movement of one of said members relative to another of said members.

7. In a valve mechanism for air brakes, a pair of pistons movable to and from each other, a cylinder forming a pressure chamber between said pistons and forming with one of said pistons a chamber vented to the atmosphere, means establishing a train pipe connection to said pressure chamber, means jointly carried by said pistons providing a passage for delivering air from said pressure chamber to a brake cylinder, means for controlling such delivery through travel of one of said pistons, said passage having an opening into said vented chamber, and means for controlling said opening through travel of the other piston.

8. In a valve mechanism for air brakes, a pair of pistons movable to and from each other, a cylinder forming a pressure chamber between said pistons, said pistons being spaced from the cylinder ends to form two end chambers, means establishing a train pipe connection to said pressure chamber, a passage for conducting air from said pressure chamber to one of said end chambers controlled by the piston separating said chambers, the other end chamber being vented to the atmosphere, means preventing return flow of air through said passage, a passage for delivering air from said pressure chamber to a brake cylinder, means for controlling such delivery through travel of one of said pistons, and means for controlling connection of the last mentioned passage with said vented end chamber, through travel of the other piston.

9. In a valve mechanism for air brakes, a pair of pistons movable to and from each other, a cylinder forming a pressure chamber between said pistons, and forming with one of said pistons a chamber vented to the atmosphere, means establishing a train pipe connection to said pressure chamber, a passage for delivering air from said pressure chamber to a brake cylinder, means for controlling such delivery through travel of one of said pistons, and means for controlling connection of said passage to said vented chamber through travel of the other piston.

10. In a valve mechanism as set forth in claim 9, a spring opposing a predetermined resistance to travel of one of said pistons from the other.

11. In a valve mechanism for air brakes, a pair of pistons movable to and from each other, a cylinder forming a pressure chamber between said pistons, and forming with one of said pistons a chamber vented to the atmosphere, means establishing a train pipe connection to said pressure chamber, a pair of telescoped tubular members, one carried by each of said pistons and jointly forming an air passage, means establishing a brake cylinder connection to said passage, means controlled by one of said pistons for establishing or cutting off a delivery of air from said pressure chamber to said passage, and means carried by the other piston for controlling connection of said passage to said vented chamber.

12. In a valve mechanism for air brakes, a pair of pistons movable to and from each other, a cylinder forming a pressure chamber between said pistons, and forming with one of said pistons a chamber vented to the atmosphere, means establishing a train pipe connection to said pressure chamber, a tubular member carried by one of said pistons extending through said pressure chamber and slidable in the other piston, said member forming an air passage, means establishing a brake cylinder connection to said passage, a valve controlling air delivery from said pressure chamber to said passage, and under control of the piston carrying said tubular member, and means for venting said brake cylinder connection controlled by the other piston.

13. In a valve mechanism for air brakes, a pair of pistons movable to and from each other, a cylinder forming a pressure chamber between said pistons, means establishing a train pipe connection to said pressure chamber, a passage for delivering air from said pressure chamber to a brake cylinder, means for controlling such delivery through travel of one of said pistons, said passage having a vent opening for relieving brake cylinder pressure, means for controlling said vent through travel of the other piston, an auxiliary reservoir, a conduit establishing an air delivery connection to said reservoir from the train pipe, control means for the last-mentioned connection carried by one of said pistons, means for delivering auxiliary reservoir air to the brake cylinder, and control means for said delivery means carried by one of said pistons.

14. In a valve mechanism for air brakes, a pair of pistons movable to and from each other, a cylinder forming a pressure chamber between said pistons, means establishing a train pipe connection to said pressure chamber, a passage for delivering air from said pressure chamber to a brake cylinder, means for controlling such delivery through travel of one of said pistons, said passage having a vent opening for relieving brake cylinder pressure, an auxiliary reservoir, means for delivering train pipe air to said reservoir, means carried by the other piston for controlling said vent opening and for controlling the last-mentioned delivery means, and means for delivering auxiliary reservoir air to the brake cylinder.

15. In a valve mechanism for air brakes, a casing having a vent opening, a train pipe, a brake cylinder, a piston operating in said cylinder controlling communication between said train pipe and brake cylinder, and a second piston operating in said cylinder and controlling communication of said brake cylinder with said vent opening.

16. In a fluid pressure brake, the combination with a train pipe, an auxiliary reservoir, and a brake cylinder, of a valve device comprising a casing and two pistons movable to and from each other in said casing, said pistons and casing jointly forming a fluid pressure chamber, means placing the train pipe in communication with said chamber, and means for controlling fluid delivery from the train pipe to the auxiliary reservoir and from said reservoir to the brake cylinder jointly by travel of said pistons.

17. In a fluid pressure brake as set forth in claim 16, a spring imposing on one of said pistons a predetermined resistance to pressure in said chamber.

18. A fluid pressure brake comprising a cylinder, a fluid chamber, and a partition between said cylinder and chamber, a train pipe connection to the cylinder, a piston positioned in the cylinder between the partition and train pipe connection, and reciprocatory to and from the partition, a passage for delivering train pipe fluid to the chamber, a valve resisting return flow through such passage, a brake cylinder, a tubular stem carried by the piston and slidable in the partition, and adapted to deliver fluid to the brake cylinder from the chamber, and a valve in said chamber adapted to seat on the stem to cut off fluid discharge to the brake cylinder from the chamber and engageable with the partition to uncover the stem, upon retraction of the piston from the partition.

19. A fluid pressure brake as set forth in claim 18, the stem extending through and axially of the cylinder.

20. A fluid pressure brake as set forth in claim 18, said stem having an abutment limiting approach of the piston to said partition.

21. A fluid pressure brake as set forth in claim 18, the cylinder having an outlet to the passage for delivering train pipe fluid to said chamber.

22. In a fluid pressure brake as set forth in claim 18, an element carried by said piston and engaging said partition to limit retraction of the piston from the partition.

DENNIS C. HESSIAN.